US011757711B1

United States Patent
Li et al.

(10) Patent No.: US 11,757,711 B1
(45) Date of Patent: Sep. 12, 2023

(54) EVENT NOTIFICATION MECHANISM FOR MIGRATING MANAGEMENT NETWORK OF A CLUSTER NODE OF A HYPER CONVERGED INFRASTRUCTURE (HCI) APPLIANCE

(71) Applicant: Dell Products L.P., Round Rock, TX (US)

(72) Inventors: Tianhe Li, Shanghai (CN); Lixia Hu, Shanghai (CN); Rui Jiang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/963,789

(22) Filed: Oct. 11, 2022

(30) Foreign Application Priority Data

Sep. 21, 2022 (CN) .......................... 202211151378.2

(51) Int. Cl.
*G06F 15/177* (2006.01)
*H04L 41/0806* (2022.01)
*H04L 41/082* (2022.01)
*H04L 41/084* (2022.01)

(52) U.S. Cl.
CPC ........ *H04L 41/0806* (2013.01); *H04L 41/082* (2013.01); *H04L 41/084* (2013.01)

(58) Field of Classification Search
CPC .. H04L 41/0806; H04L 41/082; H04L 41/084
See application file for complete search history.

(56) References Cited

U.S. PATENT DOCUMENTS

| | | | | |
|---|---|---|---|---|
| 10,841,235 B2 * | 11/2020 | Kommula | ............. | G06F 9/5061 |
| 10,970,107 B2 * | 4/2021 | Aron | ......................... | G06F 8/65 |
| 11,516,070 B1 * | 11/2022 | Shemer | .................... | H04L 41/12 |
| 2020/0034459 A1 * | 1/2020 | Rabe | ...................... | G06F 16/273 |
| 2020/0151024 A1 * | 5/2020 | Ji | ............................ | G06F 9/546 |
| 2020/0201666 A1 * | 6/2020 | Aron | ........................ | H04L 67/53 |
| 2020/0241903 A1 * | 7/2020 | Wang | ....................... | H04L 41/12 |
| 2021/0028987 A1 * | 1/2021 | Krivenok | ............. | H04L 41/0869 |
| 2021/0096878 A1 * | 4/2021 | Chomakov | ............ | G06F 9/5027 |
| 2021/0392038 A1 * | 12/2021 | Zhang | .................. | G06F 9/45558 |
| 2021/0392041 A1 * | 12/2021 | Ranjan | ................ | H04L 41/0895 |
| 2022/0035695 A1 * | 2/2022 | Hara | .................... | G06F 11/0751 |
| 2022/0156116 A1 * | 5/2022 | Yardeni | ................. | G06F 3/0653 |

(Continued)

*Primary Examiner* — Richard G Keehn
(74) *Attorney, Agent, or Firm* — Jackson Walker L.L.P

(57) ABSTRACT

A disclosed method for managing a multi-node, HCI cluster provisions a central manager of the HCI cluster with an event listening service. The service is then registered with an agent in each HCI node. The service, when triggered by a management network configuration event, causes the agent to modify a management network configuration of the node in accordance with the event. Disclosed methods may respond to successfully applying a management network configuration change by sending a success notification to the central manager and awaiting a confirmation from the central manager. If confirmation is not received within a timeout interval, a timeout occurs and the management network configuration is rolled back to a last known good configuration. If the configuration change cannot be successfully applied, a failure notification is sent to the central manager and the configuration of the node is rolled back to a last known good configuration.

20 Claims, 3 Drawing Sheets

(56) References Cited

U.S. PATENT DOCUMENTS

2022/0342886 A1* 10/2022 Harwood .............. G06F 9/5038
2023/0123303 A1*  4/2023 Patil ...................... G06F 9/5038
                                                         718/104

* cited by examiner

EVENT NOTIFICATION MECHANISM FOR MIGRATING MANAGEMENT NETWORK OF A CLUSTER NODE OF A HYPER CONVERGED INFRASTRUCTURE (HCI) APPLIANCE

TECHNICAL FIELD

The present disclosure relates to information handling systems and, more specifically, management of information handling systems that support virtualized resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be deployed as multi node computing clusters featuring a hyper converged infrastructure (HCI) implemented with one or more HCI appliances, each of which may correspond to one or more of the cluster nodes. An HCI infrastructure includes virtualized compute, storage, and networking resources with centralized and automated management.

Before deploying an HCI-based cluster, network planning is critically important. After an HCI node is deployed, it's not easy to change HCI management network configuration deployed on each Physical Node. Moreover, for those HCI nodes that are deployed at Edge area, failure to update the network configuration on Edge node may cause service down.

SUMMARY

In accordance with teachings disclosed herein, common problems associated with post-deployment reconfiguration of a management network for a multi-node HCI cluster are addressed herein.

In one aspect, a disclosed method for managing a multi-node, HCI cluster provisions a central manager of the HCI cluster, which is communicatively coupled to each node in the HCI cluster via a cluster management network and which may be referred to as an HCI management, with an event listening service. The event listening service is then registered with an agent in each node in the HCI cluster. The event listening service, when triggered by detecting a management network configuration event indicative of a management network configuration change, causes the agent to perform management network configuration operations to modify a management network configuration of the node in accordance with the management network configuration change. The management network configuration operations may include, as non-limiting examples any one or more of: changing a virtual local area network (VLAN) of the node, changing an Internet protocol (IP) subnet mask, changing a network gateway associated with the node.

Disclosed methods may respond to successfully applying a management network configuration change by sending a success notification to the central manager and awaiting a confirmation from the central manager. If confirmation is not received within a specified interval, i.e., a timeout occurs, and the management network configuration of the node is rolled back to a last known good configuration. If the management network configuration change cannot be successfully applied, a failure notification is sent to the central manager and the management network configuration of the node is rolled back to a last known good configuration.

In at least some embodiments, each node is provisioned with an operating system and the agent on each node executes within the operating system. The event listening service may be implemented as a representational state transfer (REST) application programming interface (API) service. In some embodiments each node is a physical node corresponding to an HCI appliance. Some such embodiments may feature a 1:1 correspondence between nodes and HCI appliance. Other embodiments may include at least one HCI appliance that encompasses multiple physical nodes.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
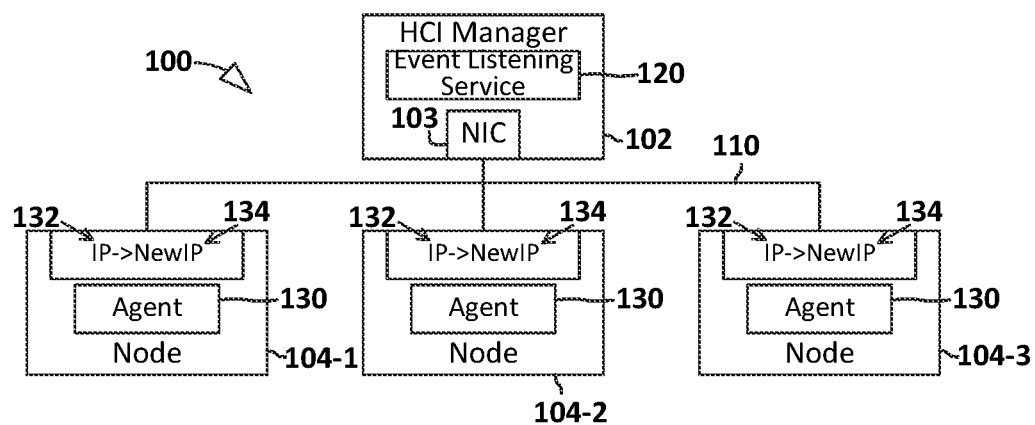
FIG. 1 illustrates a multi-node HCI cluster.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an exemplary multi-node, HCI cluster 100 suitable for implementing disclosed features for securely and reliably making post-deployment changes to the management network configuration of cluster 100. The illustrated cluster 100 includes a central management resource, referred to herein as central manager 102 or HCI manager 102, coupled through a network interface card (NIC) 103 to a plurality of physical nodes exemplified in FIG. 1 by nodes 104-1, 104-2, and 104-3, via a management network identified herein as cluster management network 110. As suggested by its name, cluster management network 110 supports trusted connections between HCI manager 102 and each node 104, enabling HCI manager 102 to provide centralized, remote, and automated management of cluster resources, including each of the nodes 104.

The HCI manager 102 illustrated in FIG. 1 includes an event listening service 120 and each of the illustrated nodes 104 includes an agent 130, which may be running on an operating system (OS) (not depicted) of each node 104, and which provides services to HCI manager 102. In at least one embodiment, event listening service 120 is suitable for carrying out secure and reliable management network configuration changes, i.e., changes in the configuration of HCI management network 110 within cluster 100. Accordingly, FIG. 1 illustrates each agent 130 performing a management network configuration change, during which an existing IP configuration 132 of each node 104 is migrated to a new IP configuration 134.

HCI manager 102 may be configured to register an event listening API into each agent 130. Upon receiving a new management network configuration from HCI manager 102, each agent 130 performs the operations to migrate or otherwise reconfigure the management network configuration of cluster 100. Once successfully finished, each agent 130 may send a success message to HCI Manager 102 and HCI manager 102 may reply to each agent 130 to confirm the network change. In the event that an agent 130 cannot successfully perform the management network configuration change, agent 130 may be configured to inform HCI manager 102 and rollback the management network configuration of each node 104 to the last known good management network configuration.

Figure 2:
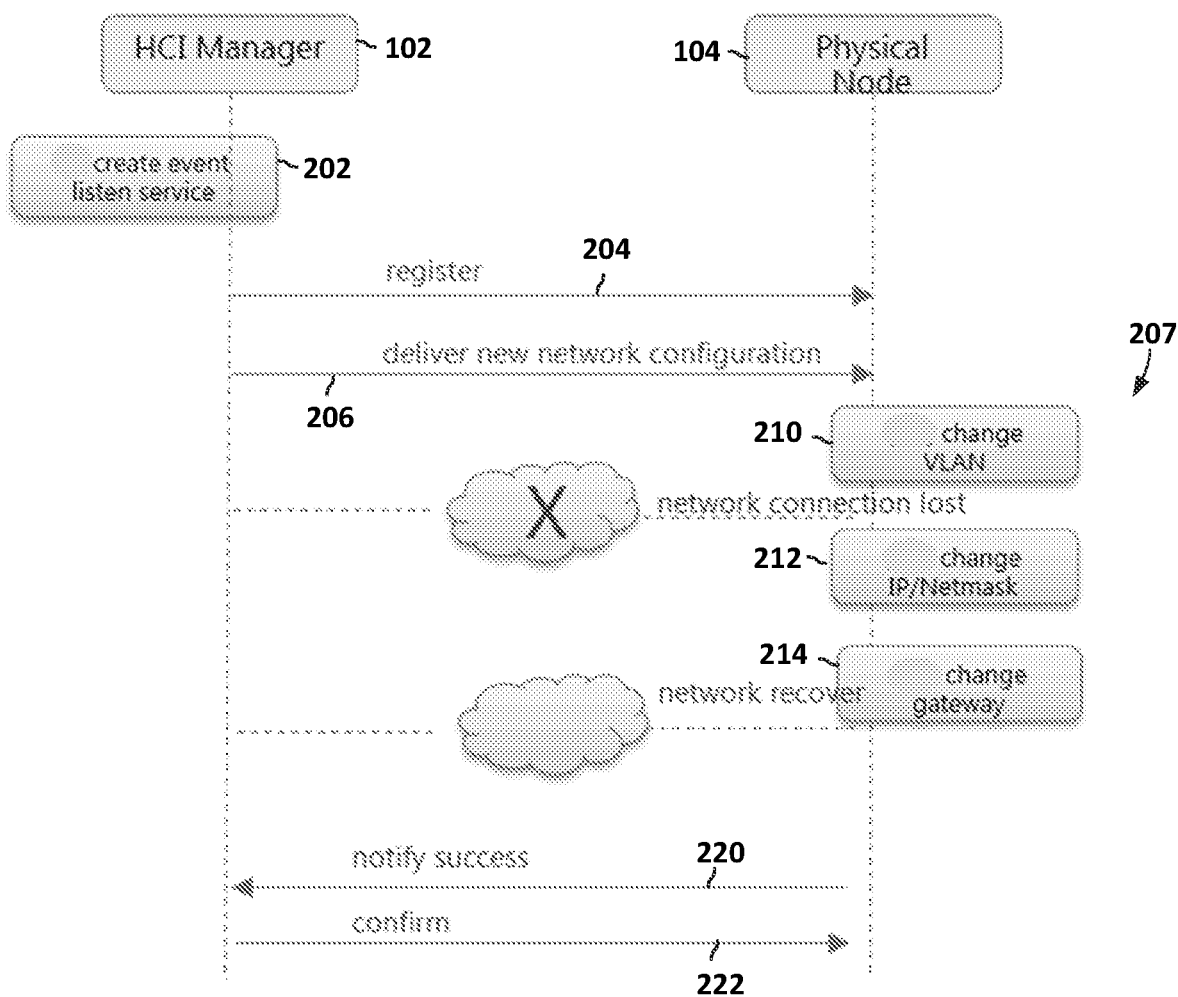
FIGS. 2, 3, and 4 illustrate a sequence of diagrams for implementing an event notification service to modify a management network configuration of a multi-node HCI cluster in accordance with disclosed teachings.

FIG. 2 illustrates an exemplary sequence diagram 200 corresponding to a successful management network configuration change implemented in accordance with disclosed subject matter. As depicted in FIG. 2, HCI manager 102 creates (operation 202) the event listening service. HCI manager 102 then registers (operation 204) the event listening service with each node 104, of which only one node 104 is depicted in FIG. 2. After registering the event listening service with the physical node, HCI manager 102 may deliver (operation 206) information indicative of a new management network configuration. The physical node 104 may respond to receiving the new network configuration information by performing management network configuration change operations 207. In the illustrated example, management network configuration operations 207 include changing (operation 210) a VLAN of the management network, changing (operation 212) an IP sub mask, and changing a network gateway (operation 214). In other embodiments, network management configurations 207 may include more, fewer, and/or different operations than those illustrated in FIG. 2.

Following successfully changing the management network configuration, node 104, as illustrated in FIG. 2, notifies (operation 220) HCI manager 102 of the successful configuration change. In response to receiving notification of the successful modification, the HCI manager 102 illustrated in FIG. 2 responds by returning a confirmation (operation 222) to each physical node 104.

Figure 3:
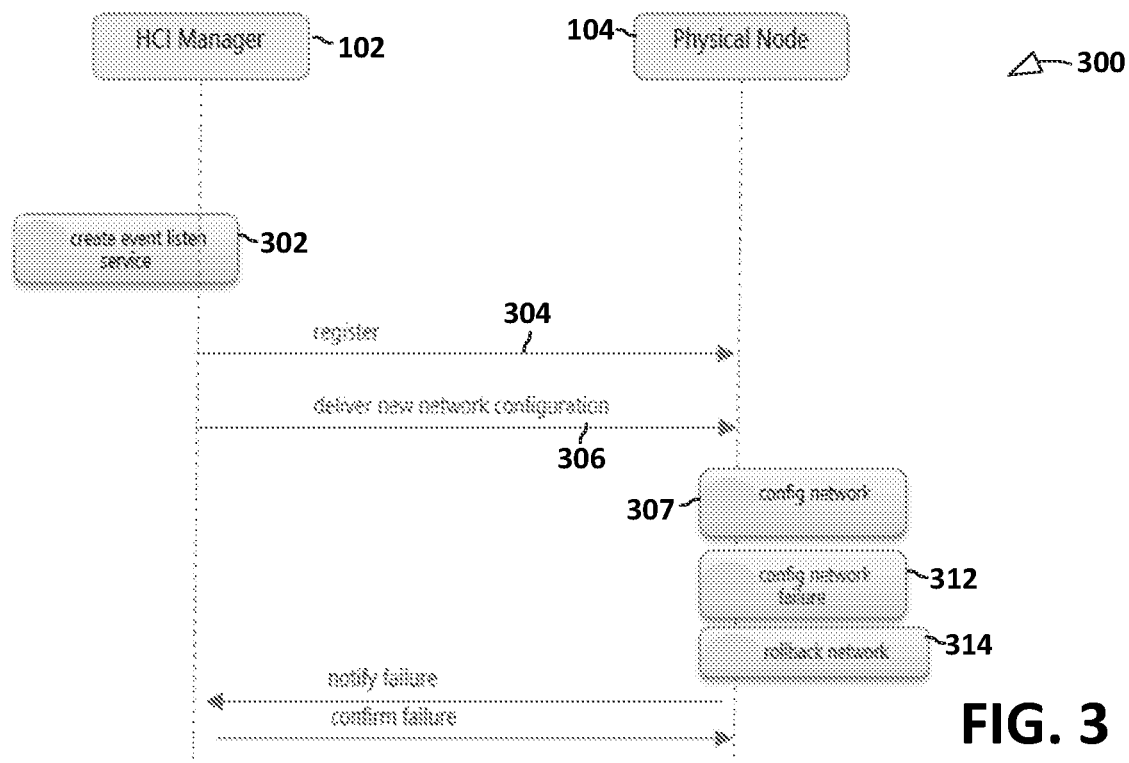

Turning now to FIG. 3, a sequence diagram 300 illustrates operation of the management network configuration event listening service when an attempted modification of the management network configuration fails. As depicted in FIG. 3, HCI manager 102 creates (operation 302) an event listening service and registers (operation 304) the event listening service with physical node 104. The HCI manager 102 depicted in FIG. 3 then delivers (operation 306) a new management network configuration to physical node 104, which responds to receiving the management network configuration information by performing management network configuration (operation 307). As depicted in FIG. 3, however, node 104 does not successfully complete network configuration operations. Instead, upon attempting to change the management network configuration, node 104 detects (operation 312) that the network configuration modification has failed. Upon determining that the network configuration change failed, node 104 performs a management network rollback (operation 314) to roll back the configuration to the last known good management network configuration. Upon rolling back the management network configuration, physical node 104 notifies (operation 320) HCI manager 102 of the configuration failure. HCI manager 102 then confirms the failure (operation 322).

Figure 4:
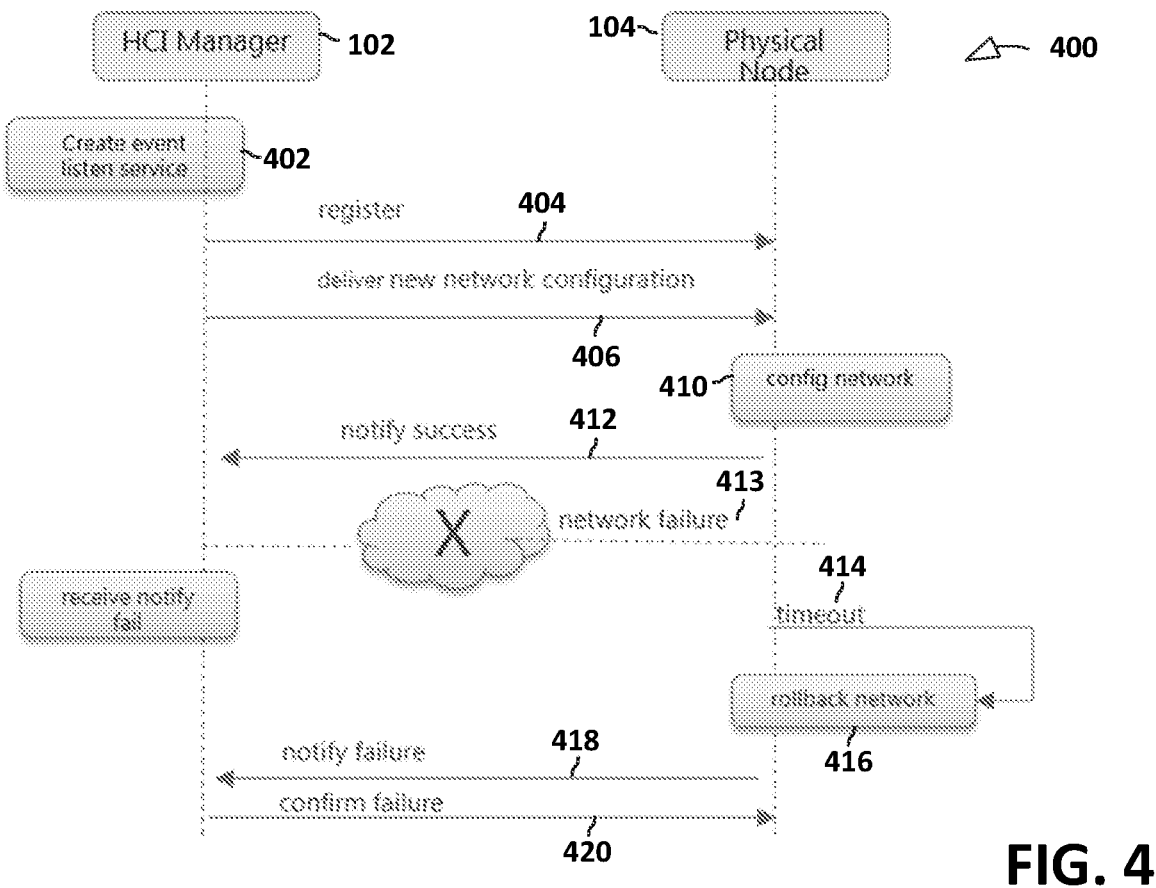

Referring now to FIG. 4, sequence diagram 400 depicts operation of the event listening service for the case in which the new network configuration causes a connection failure. As depicted in FIG. 4, HCI manager 102 once again creates (operation 402) the event listening service and registers (operation 404) the service with node 104. HCI manager 102 then delivers (operation 406) a new network configuration to physical node 104. The node 104 illustrated in FIG. 4 then successfully configures (operation 410) the management network configuration and notifies (operation 412) HCI manager 102. As depicted in FIG. 4, at some point in time after node 104 notifies HCI manager 102, a network failure 413 occurs. Despite the absence of a network connection to HCI manager 102, node 104 determines that a failure occurred when a timeout 414 occurs while node 104 is waiting for a confirmation of notification 412 from HCI manager 102. In response, node 104 rolls back (operation 416) the management network configuration to the last known good configuration, notifies (operation 418) and receives (operation 420) confirmation from HCI manager 102.

Figure 5:
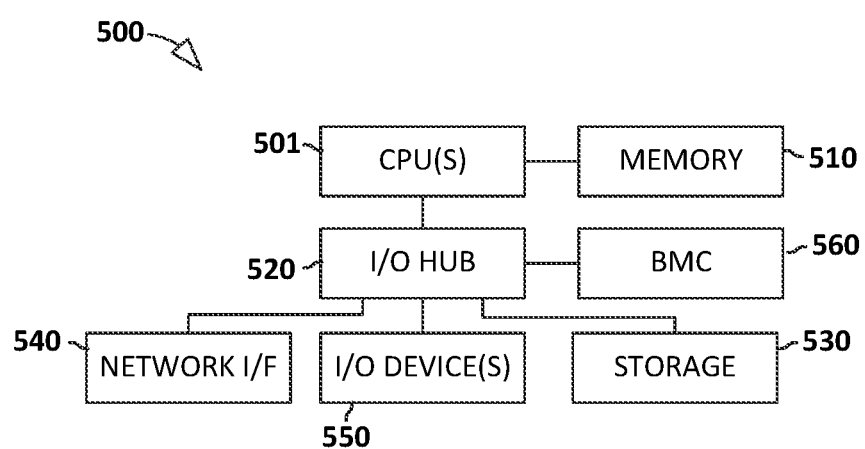
FIG. 5 illustrates an exemplary information handling system suitable for use in conjunction with disclosed teachings.

Referring now to FIG. 5, any one or more of the elements illustrated in FIG. 1 through FIG. 4 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes a baseboard management controller (BMC) 560 providing, among other features and services, an out-of-band management resource which may be coupled to a management server (not depicted). In at least some embodiments, BMC 560 may manage information handling system 500 even when information handling system 500 is powered off or powered to a standby state. BMC 560 may include a processor, memory, an out-of-band network interface separate from and physically isolated from an in-band network interface of information handling system 500, and/or other embedded information handling resources. In certain embodiments, BMC 560 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing a multi-node, hyper converged infrastructure (HCI) cluster, the method comprising:
provisioning a central manager of the HCI cluster, communicatively coupled to each node in the HCI cluster via a cluster management network, with an event listening service; and
registering the event listening service with an agent in each node in the HCI cluster, wherein the event listening service, when triggered by detecting a management network configuration event indicative of a management network configuration change, causes the agent to perform management network configuration operations to modify a management network configuration of the node in accordance with the management network configuration change.

2. The method of claim 1, wherein the management network configuration operations include, responsive to successfully applying the management network configuration change, sending a success notification to the central manager.

3. The method of claim 2, wherein the management network configuration operations include, responsive to not receiving confirmation of the success notification within a timeout interval following the sending of the success notification, rolling back the management network configuration of the node to a last known good management network configuration.

4. The method of claim 1, wherein the management network configuration operations include, responsive to failing to successfully applying the management network configuration change, sending a failure notification to the central manager and rolling back the management network configuration of the node to a last known good configuration.

5. The method of claim 1, wherein the management network configuration operations include at least one of:
   a change in a virtual local area network (VLAN) of the node;
   a change in an Internet protocol (IP) subnet mask; and
   a change in a network gateway associated with the node.

6. The method of claim 1, wherein each node is provisioned with an operating system and wherein the agent on each node executes within the operating system.

7. The method of claim 1, wherein the event listening service comprises a representational state transfer (REST) application programming interface (API) service.

8. The method of claim 1, wherein each node corresponds to an HCI appliance.

9. The method of claim 8, wherein each HCI appliance corresponds to one node.

10. The method of claim 8, wherein at least one HCI appliance encompasses two or more nodes.

11. An information handling system, comprising:
   a central processing unit (CPU); and
   a memory including processor-executable instructions that, when executed by the CPU, cause the system to perform management operations for managing a multi-node, hyper converged infrastructure (HCI) cluster, wherein the management operations include:
   provisioning a central manager of the HCI cluster, communicatively coupled to each node in the HCI cluster via a cluster management network, with an event listening service; and
   registering the event listening service with an agent in each node in the HCI cluster, wherein the event listening service, when triggered by detecting a management network configuration event indicative of a management network configuration change, causes the agent to perform management network configuration operations to modify a management network configuration of the node in accordance with the management network configuration change.

12. The information handling system of claim 11, wherein the management network configuration operations include, responsive to successfully applying the management network configuration change, sending a success notification to the central manager.

13. The information handling system of claim 12, wherein the management network configuration operations include, responsive to not receiving confirmation of the success notification within a timeout interval following the sending of the success notification, rolling back the management network configuration of the node to a last known good management network configuration.

14. The information handling system of claim 11, wherein the management network configuration operations include, responsive to failing to successfully applying the management network configuration change, sending a failure notification to the central manager and rolling back the management network configuration of the node to a last known good configuration.

15. The information handling system of claim 11, wherein the management network configuration operations include at least one of:
   a change in a virtual local area network (VLAN) of the node;
   a change in an Internet protocol (IP) subnet mask; and
   a change in a network gateway associated with the node.

16. The information handling system of claim 11, wherein each node is provisioned with an operating system and wherein the agent on each node executes within the operating system.

17. The information handling system of claim 11, wherein the event listening service comprises a representational state transfer (REST) application programming interface (API) service.

18. The information handling system of claim 11, wherein each node corresponds to an HCI appliance.

19. The information handling system of claim 18, wherein each HCI appliance corresponds to one node.

20. The information handling system of claim 18, wherein at least one HCI appliance encompasses two or more nodes.

* * * * *